United States Patent
Jun et al.

(10) Patent No.: US 10,824,523 B2
(45) Date of Patent: Nov. 3, 2020

(54) DATA STORAGE DEVICE AND OPERATING METHOD THEREOF

(71) Applicant: SK hynix Inc., Gyeonggi-do (KR)

(72) Inventors: Jang Hwan Jun, Gyeonggi-do (KR); Yeong Dong Gim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 195 days.

(21) Appl. No.: 16/165,646

(22) Filed: Oct. 19, 2018

(65) Prior Publication Data
US 2019/0310923 A1    Oct. 10, 2019

(30) Foreign Application Priority Data
Apr. 6, 2018  (KR) .................. 10-2018-0040226

(51) Int. Cl.
*G06F 11/00* (2006.01)
*G06F 11/16* (2006.01)
*G06F 3/06* (2006.01)

(52) U.S. Cl.
CPC ........ *G06F 11/1666* (2013.01); *G06F 3/0619* (2013.01); *G06F 3/0647* (2013.01); *G06F 3/0659* (2013.01); *G06F 3/0679* (2013.01); *G06F 2201/805* (2013.01); *G06F 2201/82* (2013.01)

(58) Field of Classification Search
CPC .. G06F 11/1417; G06F 11/1666; G06F 11/22; G06F 11/2284; G06F 11/27; G06F 11/3037
See application file for complete search history.

(56) References Cited

U.S. PATENT DOCUMENTS

| | | | | |
|---|---|---|---|---|
| 2011/0138222 A1* | 6/2011 | Haines | ................ | G06F 11/1048 714/6.12 |
| 2015/0309864 A1* | 10/2015 | Kim | .................... | G06F 11/1008 714/764 |
| 2016/0055069 A1* | 2/2016 | Jeansonne | ............. | G06F 3/0683 714/15 |

FOREIGN PATENT DOCUMENTS

KR    1020170031311    3/2017

* cited by examiner

*Primary Examiner* — Michael Maskulinski
(74) *Attorney, Agent, or Firm* — IP & T Group LLP

(57) ABSTRACT

A data storage device includes a nonvolatile memory device and a controller which controls the nonvolatile memory device. When the data storage device is powered on after a sudden power off (SPO), the controller detects an erased page by scanning, without decoding, a first system data block of a nonvolatile memory device, performs simple decoding for first system data of first system pages before the erased page, and, if the simple decoding is a fail, recovers the first system data for which the simple decoding failed, by reading out second system data from corresponding second system pages of a second system data block as a duplicate block of the first system data block.

16 Claims, 9 Drawing Sheets

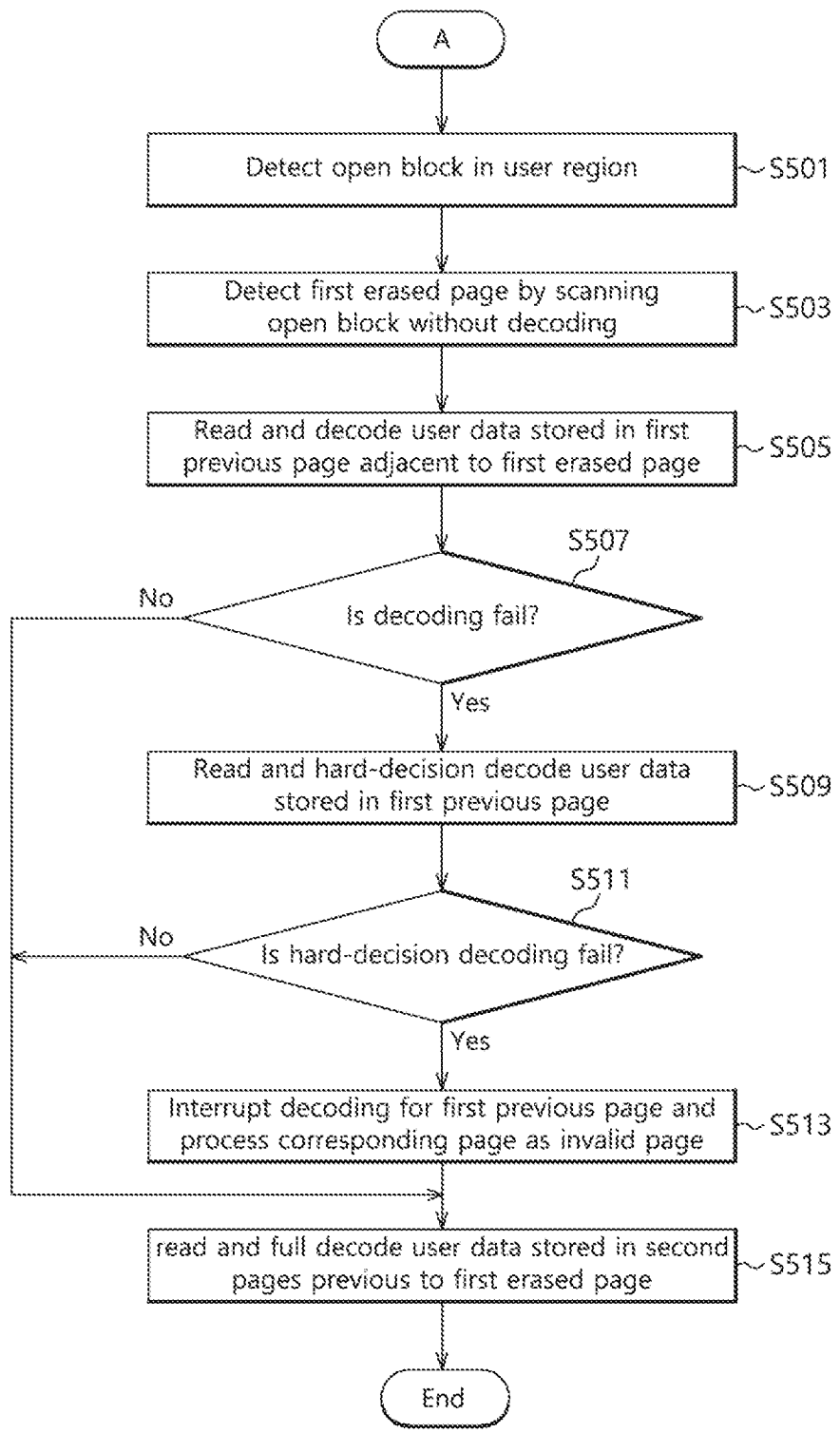

DATA STORAGE DEVICE AND OPERATING METHOD THEREOF

CROSS-REFERENCE TO RELATED APPLICATION

The present application claims priority under 35 U.S.C. § 119(a) to Korean application number 10-2018-0040226, filed on Apr. 6, 2018, in the Korean Intellectual Property Office, which is incorporated herein by reference in its entirety.

BACKGROUND

1. Technical Field

Various embodiments generally relate to a semiconductor device, and, more particularly, to a data storage device and an operating method thereof.

2. Related Art

Recently, the paradigm for the computer environment has shifted to ubiquitous computing in which computer systems can be used anytime and anywhere. Due to this fact, the use of portable electronic devices such as mobile phones, digital cameras, and notebook computers has rapidly increased. In general, such portable electronic devices use a data storage device which uses a memory device. A data storage device is used to store data to be used in a portable electronic device.

A data storage device using a memory device provides advantages in that, since there is no mechanical driving part, stability and durability are excellent, information access speed is high and power consumption is small. Data storage devices having such advantages include a universal serial bus (USB) memory device, memory cards having various interfaces, a universal flash storage (UFS) device, and a solid state drive (SSD).

SUMMARY

Various embodiments are directed to a data storage device and an operating method thereof, capable of shortening the time of recovery performed after a sudden power off (SPO) and minimizing the influence of read disturbance.

In an embodiment, a data storage device includes a nonvolatile memory device and a controller which controls the nonvolatile memory device. When the data storage device is powered on after a sudden power off (SPO), the controller detects an erased page by scanning, without decoding, a first system data block of a nonvolatile memory device, performs simple decoding for first system data of first system pages before the erased page, and, if the simple decoding is a fail, recovers the first system data for which the simple decoding failed, by reading out second system data from corresponding second system pages of a second system data block as a duplicate block of the first system data block.

In an embodiment, a method for operating a data storage device may include: detecting, when the data storage device is powered on after a sudden power off (SPO), a first erased page by scanning, without decoding, a first system data block of a nonvolatile memory device; performing simple decoding for first system data stored in first system pages preceding the first erased page; determining whether the simple decoding failed; and recovering, if it is determined that the simple decoding failed, the first system data for which the simple decoding failed, by reading out second system data from corresponding second system pages of a second system data block, which is a duplicate block of the first system data block.

In an embodiment, a data storage device includes a memory device including a first system data block and a second system data block and a controller suitable for controlling the memory device to store original system data in the first system data block and duplicate system data in the second system data block, detecting an erased page by scanning the first system data block without decoding, reading, and performing simple decoding of, first system data, which is stored in at least one first data page preceding the erased page in the first system data block, if the simple decoding for the first system data fails, reading of second system data from a second data page of the second system data block, the second system data being duplication data of the first system data, recovering the first system data using the second system data.

In accordance with the embodiments, in a recovery operation performed after an SPO, decoding for read data read out by read operations for finding a first erased page is skipped, and decoding for system data of which duplication data exists or data of which program is interrupted by the SPO is performed up to only hard decision decoding. Consequently, as unnecessary decoding is not performed, a time required for the recovery operation may be shortened.

Also, as unnecessary decoding is not performed, it is possible to prevent a read count for a recovery target memory block from markedly increasing, and as a result, it is possible to prevent a large amount of data from being damaged by the influence of read disturbance.

BRIEF DESCRIPTION OF THE DRAWINGS

FIG. 5 is a flow chart illustrating a method for operating a data storage device in accordance with an embodiment.

DETAILED DESCRIPTION

A data storage device and an operating method thereof will be described below with reference to the accompanying drawings through various embodiments. It is noted that, throughout the specification, reference to "an embodiment" or the like is not necessarily to only one embodiment, and different references to any such phrase are not necessarily to the same embodiment(s).

Figure 1:
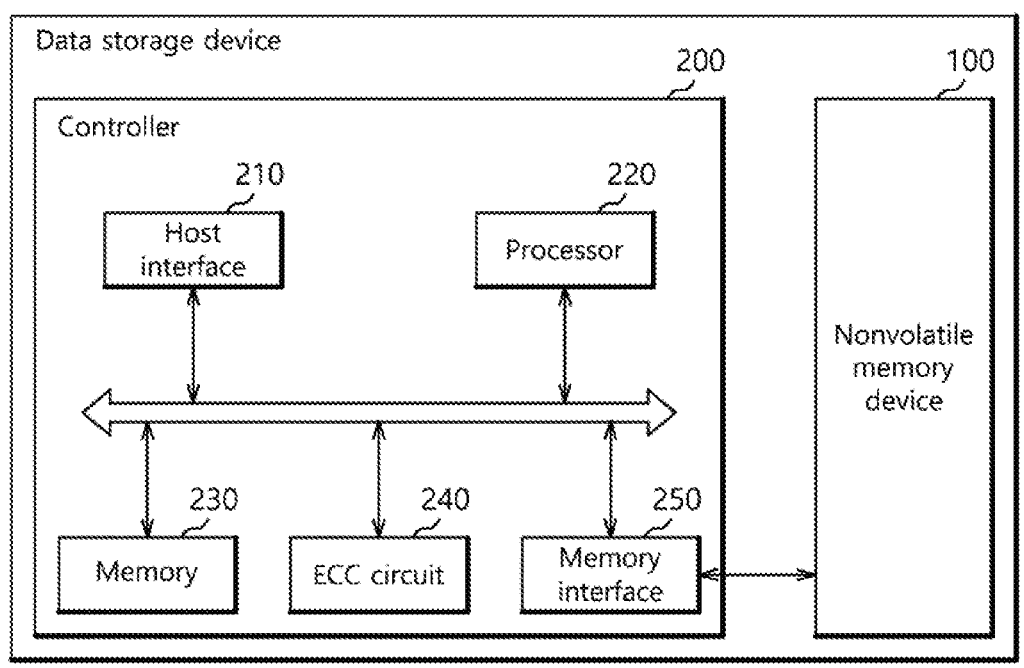
FIG. 1 is a diagram illustrating a data storage device in accordance with an embodiment.

FIG. 1 is a diagram illustrating a data storage device 10 in accordance with an embodiment.

Referring to FIG. 1, the data storage device 10 may store data to be accessed by a host device (not shown) such as a mobile phone, an MP3 player, a laptop computer, a desktop computer, a game player, a television (TV), an in-vehicle infotainment system, and so forth. The data storage device 10 may be referred to as a memory system.

The data storage device 10 may be manufactured or configured as any one of various kinds of storage devices according to the protocol of an interface defining communication with the host device. For example, the data storage device 10 may be configured as any one of a solid state drive, a multimedia card (e.g., an MMC, an eMMC, an RS-MMC and a micro-MMC), a secure digital card (e.g., an SD, a mini-SD and a micro-SD), a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The data storage device 10 may be manufactured as any one among various kinds of package types. For example, the data storage device 10 may be manufactured as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 10 may include a nonvolatile memory device 100 and a controller 200.

The nonvolatile memory device 100 may operate as the storage medium of the data storage device 10. The nonvolatile memory device 100 may be implemented as any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PRAM) using a chalcogenide alloy, and a resistive random access memory (ReRAM or RRAM) using a transition metal compound, depending on memory cells.

While FIG. 1 illustrates that the data storage device 10 includes one nonvolatile memory device 100, this is only an example; the data storage device 10 may include a plurality of nonvolatile memory devices. Moreover, aspects of the present invention may be applied in the same manner to a data storage device which includes a plurality of nonvolatile memory devices.

The nonvolatile memory device 100 may include a memory cell array (not shown) which has a plurality of memory cells respectively disposed at regions where a plurality of bit lines (not shown) and a plurality of word lines (not shown) intersect with each other. The memory cell array may include a plurality of memory blocks, and each of the plurality of memory blocks may include a plurality of pages.

For example, each memory cell of the memory cell array may be a single level cell (SLC) storing one bit, a multi-level cell (MLC) capable of storing 2-bit data, a triple level cell (TLC) capable of storing 3-bit data or a quad level cell (QLC) capable of storing 4-bit data. The memory cell array may include single level cells, multi-level cells, triple level cells and/or quad level cells. For example, the memory cell array may include memory cells of a 2-dimensional horizontal structure or memory cells of a 3-dimensional vertical structure.

Figure 2A:
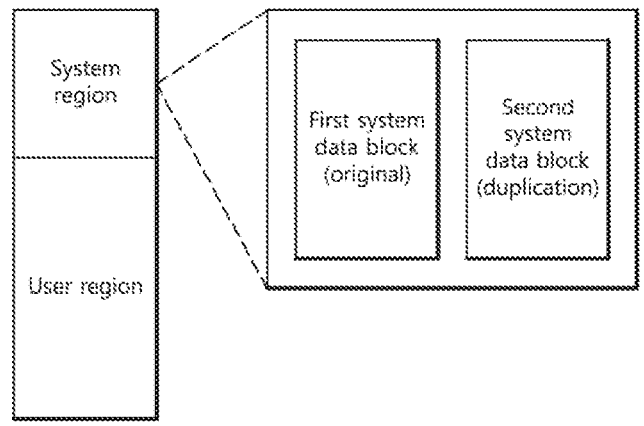
FIG. 2A is a diagram illustrating an example of system data blocks included in a system region of a nonvolatile memory device.
Figure 2B:
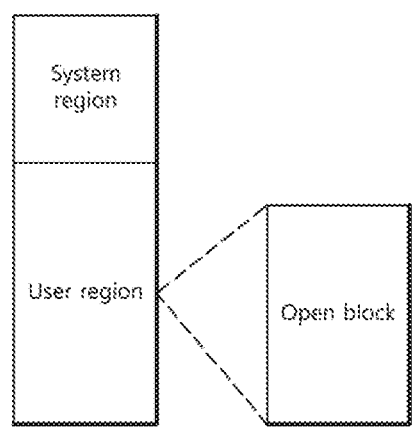
FIG. 2B is a diagram illustrating an example of an open block included in a user region of a nonvolatile memory device.

FIG. 2A is a diagram illustrating system data blocks included in a system region, for example, the system region of the nonvolatile memory device 100 of FIG. 1, and FIG. 2B is a diagram illustrating an open block included in a user region, for example, the user region of the nonvolatile memory device 100.

Referring to FIG. 2A, the nonvolatile memory device 100 may include the system region and the user region. In the system region, there may be stored various system data necessary for the operation of the nonvolatile memory device 100. The system data as data necessary for driving of firmware may include various data such as a map table and the initialization information, the operating bias information, the operation timing information, the bad block information, the repair information and the operation state information of the nonvolatile memory device 100. The system data may be stored in duplicate in two blocks in preparation for damage. That is, as shown in FIG. 2A, the system region of the nonvolatile memory device 100 may include a first system data block and a second system data block, each of which stores the same system data.

The system data stored in the respective pages of the first system data block are stored in the same pages of the second system data block. The first system data block may be referred to as an original system data block, and the second system data block may be referred to as a duplicate system data block.

Referring FIG. 2B, the user region of the nonvolatile memory device 100 may include a plurality of user data blocks in which write data received from the host device are stored. A processor 220 selects one block, among the plurality of user data blocks, and controls the nonvolatile memory device 100 to store write data received from the host device in the corresponding block. A user data block which is selected by the processor 220 and is in use is referred to as an open block.

Referring again to FIG. 1, the controller 200 may control general operations of the data storage device 10 by executing firmware or software loaded in a memory 230. The controller 200 may decode and drive a code type instruction or algorithm such as firmware or software. The controller 200 may be embodied in the form of hardware or a combination of hardware and software.

The controller 200 may include a host interface 210, the processor 220, the memory 230, an error correction code (ECC) circuit 240 and a memory interface 250.

The host interface 210 may interface the host device and the data storage device 10 in correspondence to a protocol of the host device. For example, the host interface 210 may communicate with the host device through any one of universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-e or PCIe) protocols.

The processor 220 may be implemented by a micro control unit (MCU) or a central processing unit (CPU). The processor 220 may process a request received from the host device. In order to process such a received request, the processor 220 may drive a code type instruction or algorithm, that is, firmware, loaded in the memory 230, and may control the internal function blocks such as the host interface 210, the memory 230, the ECC circuit 240 and the memory interface 250 and the nonvolatile memory device 100.

The processor 220 may generate control signals for controlling the operations of the nonvolatile memory device 100, based on requests received from the host device, and may provide the generated control signals to the memory interface 250.

The processor 220 may perform a recovery operation for the data storage device 10 after a sudden power off (SPO). The recovery operation may be an operation that is performed to allow the data storage device 10 to be in a state in which it is able to perform an operation (e.g., a read operation or a write operation) in response to a request from the host device (e.g., a read request, or a write request). For example, the recovery operation may include an operation of loading a bootloader from the read only memory (ROM) (not shown) of the data storage device 10 to the memory 230, an operation of performing a boot-up by loading code type instructions from the nonvolatile memory device 100 to the memory 230 using the bootloader, an operation of reading system data from the nonvolatile memory device 100 and loading the system data in the memory 230, and an operation of searching a first erased page by finding an open block which is being used when an SPO occurs, based on the system data, and recovering data written in pages previous to the first erased page.

The processor 220 may control the ECC circuit 240 to skip decoding when performing a specific operation. For example, the specific operation includes an operation of searching for a first erased page, among operations to be performed in the recovery operation. The processor 220 may control the ECC circuit 240 to skip a decoding operation for data read out by a read operation for finding a first erased page (referred to as a 'first read operation').

The processor 220 may control the ECC circuit 240 to perform simple decoding for system data read out by a read operation for system data (referred to as a 'second read operation'). The processor 220 may control the ECC circuit 240 to perform simple decoding for user data read out by a read operation for a page which is supposed to be program-interrupted by an SPO (referred to as a 'third read operation'). The simple decoding may mean to sequentially perform normal decoding and hard decision decoding.

The processor 220 may control the ECC circuit 240 to perform full decoding for user data read out by a read operation for user data written in pages previous to the first erased page (referred to as a 'fourth read operation'). The full decoding may mean to sequentially perform normal decoding, hard decision decoding and soft decision decoding.

The memory 230 may be implemented by a random access memory such as a dynamic random access memory (DRAM) or a static random access memory (SRAM). The memory 230 may store a firmware to be driven by the processor 220. Also, the memory 230 may store data necessary for driving the firmware, for example, metadata. Namely, the memory 230 may operate as the working memory of the processor 220.

The memory 230 may be configured to temporarily store program data to be transmitted from the host device to the nonvolatile memory device 100 or read data to be transmitted from the nonvolatile memory device 100 to the host device. In other words, the memory 230 may operate as a buffer memory.

The ECC circuit 240 may be configured to correct an error included in read data read out from the nonvolatile memory device 100. The ECC circuit 240 may correct an error by decoding read data according to an error correction code. For example, an error correction code may include error correction codes of various schemes such as Bose, Chaudhri, Hocquenghem (BCH) code, Reed Solomon (RS) code, Reed-Muller codes, Hamming code, convolutional code and low density parity check code (LDPC). Any other suitable error correction code may also be used.

Figure 3:
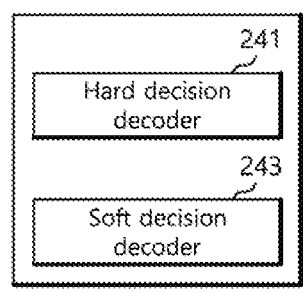
FIG. 3 is a diagram illustrating an error correction code (ECC) circuit in accordance with an embodiment.

FIG. 3 is a diagram illustrating an error correction code (ECC) circuit in accordance with an embodiment, for example, the ECC circuit 240 of FIG. 1. The ECC circuit 240 may include a hard decision decoder 241 and a soft decision decoder 243. While FIG. 3 only illustrates the ECC circuit 240 as including the hard decision decoder 241 and the soft decision decoder 243 the ECC circuit 240 may further include an encoder for performing an encoding operation, an input/output circuit for inputting/outputting data (for example encoded data or decoded data), a control circuit for performing general operations of the ECC circuit 240, and other related components.

The hard decision decoder 241 may be configured to correct an error included in second to fourth read data read out from the nonvolatile memory device 100, according to a hard decision algorithm. The soft decision decoder 243 may be configured to correct an error included in a plurality of fourth data read out from the nonvolatile memory device 100 by a plurality of read operations based on soft decision read voltages, according to a soft decision algorithm. Since hard decision decoding and soft decision decoding correspond to techniques already known in the art, detailed description of such decoding is omitted herein.

The ECC circuit 240 may provide, by skipping decoding, specific read data, that is, read data read out by the first read operation, to the processor 220, according to the control of the processor 220. The read data read out by the first read operation may include data and parity information associated with the data. The ECC circuit 240 may provide only the data to the processor 220 by excluding the parity information from the read data. The processor 220 of FIG. 1 may determine whether a corresponding page is an erased page, based on the data provided from the ECC circuit 240. In other words, regardless of whether an error is present in the read data read out by the first read operation, the processor 220 may determine the corresponding page to be an erased page or a programmed page in accordance with the corresponding read data. When the corresponding read data has the value of the erased state, the processor 220 may determine that the corresponding page is an erased page. When the corresponding read data has the value of a programmed state, the processor 220 may determine that the corresponding page is the programmed page.

The ECC circuit 240 may perform simple decoding of sequentially performing normal decoding and hard decision decoding, for first system data and first user data according to the control of the processor 220. The first system data may be read out from the first system data block by the second read operation. The first user data may be read out from a page which is supposed to be program-interrupted by an SPO, by the third read operation.

If the simple decoding of the first system data fails, the processor 220 may recover the first system data of which simple decoding failed. Recovering the first system data may be performed, by the processor 220, by interrupting the recovery operation for the first system data, and reading and decoding second system data stored in a corresponding system page of the second system data block and loading the second system data in the memory 230. That is, the processor 220 may not perform an unnecessary recovery operation exceeding hard decision decoding, for system data which is stored in duplicate in the two blocks, and may recover the first system data by reading system data from a corresponding region of the second system data block in which the same system data is stored.

If the simple decoding of the first user data (that is, the data program-interrupted by the SPO) failed, the processor 220 may interrupt the recovery operation for the first user data by determining that a corresponding page is a page which is program-interrupted by the SPO, and may process the page in which the first user data is stored, as an invalid page.

In this way, in a recovery operation performed after an SPO, decoding for read data read out by read operations for finding a first erased page is skipped, and decoding for system data of which duplication data exists or data of which program is interrupted by the SPO is performed up to only hard decision decoding. Due to this fact, as the number of times of repeatedly performing unnecessary decoding is decreased, it is possible to shorten a time required for a recovery operation.

Also, as unnecessary decoding is not performed, it is to possible to prevent a read count for a recovery target memory block from increasing, and as a result, it is possible to prevent a large amount of data from being damaged by the influence of read disturbance.

Referring again to FIG. 1, the memory interface 250 may control the nonvolatile memory device 100 according to the control of the processor 220. The memory interface 250 may also be referred to as a memory controller. The memory interface 250 may provide control signals to the nonvolatile memory device 100. The control signals may include a command, an address and the like for controlling the nonvolatile memory device 100. The memory interface 250 may provide data to the nonvolatile memory device 100 or may be provided with data from the nonvolatile memory device 100.

Figure 4:
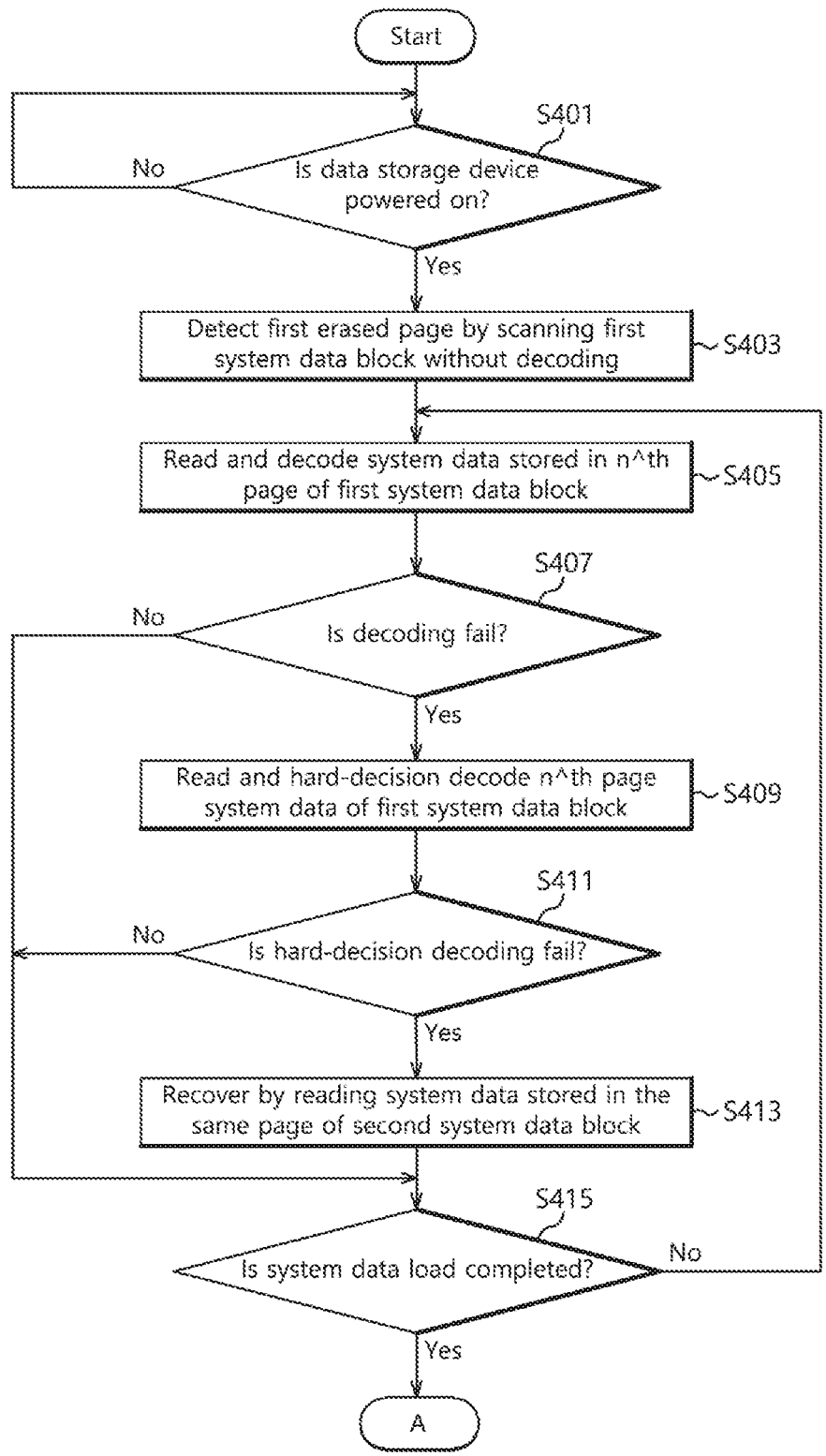
FIG. 4 is a flow chart illustrating a method for operating a data storage device in accordance with an embodiment.

FIG. 4 is a flow chart illustrating a method for operating a data storage device, e.g., data storage device 10, in accordance with an embodiment. In detail, FIG. 4 illustrates a first recovery operation performed in the data storage device 10 which is powered on after an SPO. The first recovery operation may include a process of loading system data stored in the nonvolatile memory device 100, in the memory 230. The method for operating the data storage device 10 of FIG. 4 is also described with reference to FIGS. 1 to 3, 6A and 6B.

Referring to FIG. 4, at step S401, the processor 220 of the controller 200 of FIG. 1 may determine whether the data storage device 10 is powered on. When the data storage device 10 is powered on (S401, Yes), the process may proceed to step S403.

At the step S403, the processor 220 may detect an erased page by scanning, without decoding, the first system data block existing in the system region of the nonvolatile memory device 100. The detecting of an erased page by performing scanning without decoding may include reading out the system data stored in each page of the first system data block and not performing decoding for the read-out system data. The erased page detected at the step S403 may be a first erased page among a plurality of erased pages in the first system data block.

The processor 220 may perform one or more first read operations for detecting the first erased page in the first system data block. For example, in order to detect the first erased page in the first system data block, the processor 220 may provide at least one first read command to the nonvolatile memory device 100 through the memory interface 250. In response to the first read command(s) provided, the nonvolatile memory device 100 may read out first system data from corresponding first system data pages of the first system data block, and may provide the read-out first system data to the memory interface 250.

The memory interface 250 may transmit the first system data provided from the nonvolatile memory device 100, to the ECC circuit 240. The ECC circuit 240 may skip decoding for the first system data and provide only system data which is obtained by excluding parity information from the first system data, to the processor 220, according to the control of the processor 220. The processor 220 may determine whether a corresponding system page is in an erased state or a programmed state, based on the data provided from the ECC circuit 240.

Figure 6A:
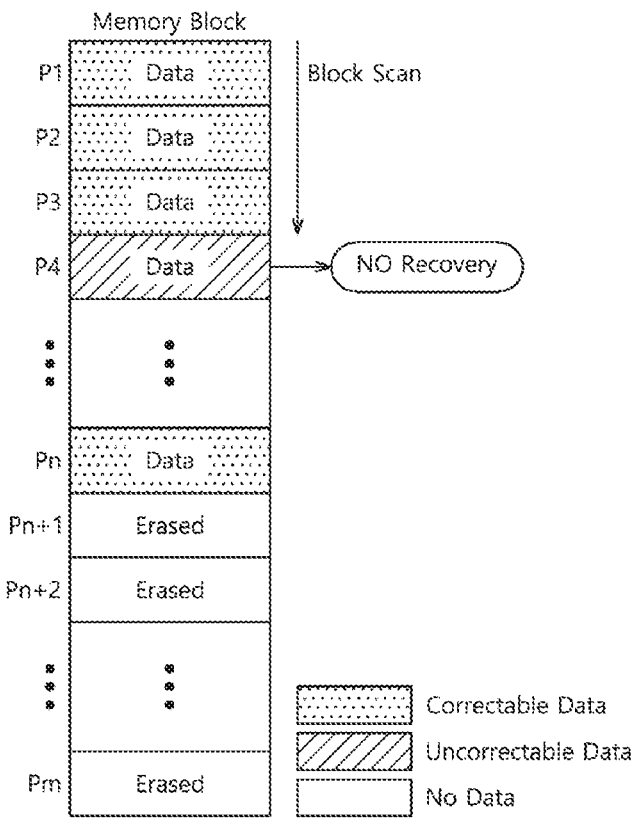
FIG. 6A is a diagram illustrating a process of searching an erased page in accordance with an embodiment.

An example will be described below with reference to FIG. 6A. In this example, the memory block shown in FIG. 6A is a system data block. Here, it is assumed that scan for the memory block is started from a first page P1, and that the data stored in the fourth page P4 of the memory block is uncorrectable data.

For example, the processor 220 provides a read command for performing a read operation for a first page P1 of the memory block, to the nonvolatile memory device 100 through the memory interface 250. The nonvolatile memory device 100 reads out data (for example, first data) from the first page P1 by performing the read operation for the first page P1 of the memory block in response to the provided read command, and provides the read-out first data to the memory interface 250.

The memory interface 250 transmits the first data provided from the nonvolatile memory device 100, to the ECC circuit 240, and the ECC circuit 240 does not perform decoding for the first data. The ECC circuit 240 provides only data obtained by excluding parity information from the first data, to the processor 220, and the processor 220 determines the first page P1 as a programmed state based on the data provided from the ECC circuit 240.

Thereafter, the processor 220 sequentially provides read commands for a second page P2 to an mth page Pm of the memory block, to the nonvolatile memory device 100. The nonvolatile memory device 100 reads out data from the respective pages P2 to Pm in response to the sequentially provided read commands and provides the read-out data to the memory interface 250.

As shown in FIG. 6A, while uncorrectable data is stored in the fourth page P4 of the memory block, the ECC circuit 240 does not perform decoding for the data read out from the fourth page P4, and provides only data obtained by excluding parity information from the corresponding read-out data, to the processor 220. The processor 220 determines that the fourth page P4 is a programmed state, based on the provided data.

In this way, at step for searching for an erased page in a memory block, only whether data is stored in each page is determined regardless of whether an error exists in the data stored in each page of the memory block. In other words, in searching for an erased page in a memory block, since decoding for the data stored in each page of the memory block is not performed, a recovery operation due to a decoding fail is not performed as well.

At step S405, the processor 220 may control the nonvolatile memory device 100 to perform a second read operation for reading out the first system data stored in an nth system page of the first system data block. Here, n may be an integer of 1 or more. For example, the processor 220 may control the nonvolatile memory device 100 to read out the first system data stored in the first page of the first system data block to the first system data stored in a page immediately before the first erased page detected at the step S403.

The processor 220 may control the operation of the ECC circuit 240 to perform decoding for the first system data read out by the second read operation. The decoding for the first system data, performed at the step S405, may be normal decoding.

At step S407, the processor 220 may determine whether normal decoding failed. That is, the processor 220 may determine whether decoding of the first system data read out from the n^th system page of the first system data block failed. If the decoding succeeded (S407, No), the process may proceed to step S415. If the decoding failed (S407, Yes), the process may proceed to step S409.

At the step S409, the processor 220 may control the nonvolatile memory device 100 to perform again the second read operation for the nth system page of the first system data block, and may control the ECC circuit 240 to perform hard decision decoding for read-out first system data.

At step S411, the processor 220 may determine whether the hard decision decoding of the first system data read out from the nth system page of the first system data block fails. If the hard decision decoding succeeded (S411, No), the process may proceed to the step S415. If the hard decision decoding failed (S411, Yes), the process may proceed to step S413.

At the step S413, the processor 220 may control the nonvolatile memory device 100 to read out corresponding second system data from the nth system page of the second system data block. In the second system data block, system data is stored in duplicate, which is the same as the first system data stored in the first system data block. The processor 220 may control the ECC circuit 240 to recover the first system data by using the second system data read out from the second system data block. Recovering the first system data by using the second system data may be performed by decoding the second system data and loading the decoded second system data in the memory 230 instead of the first system data.

Figure 6B:
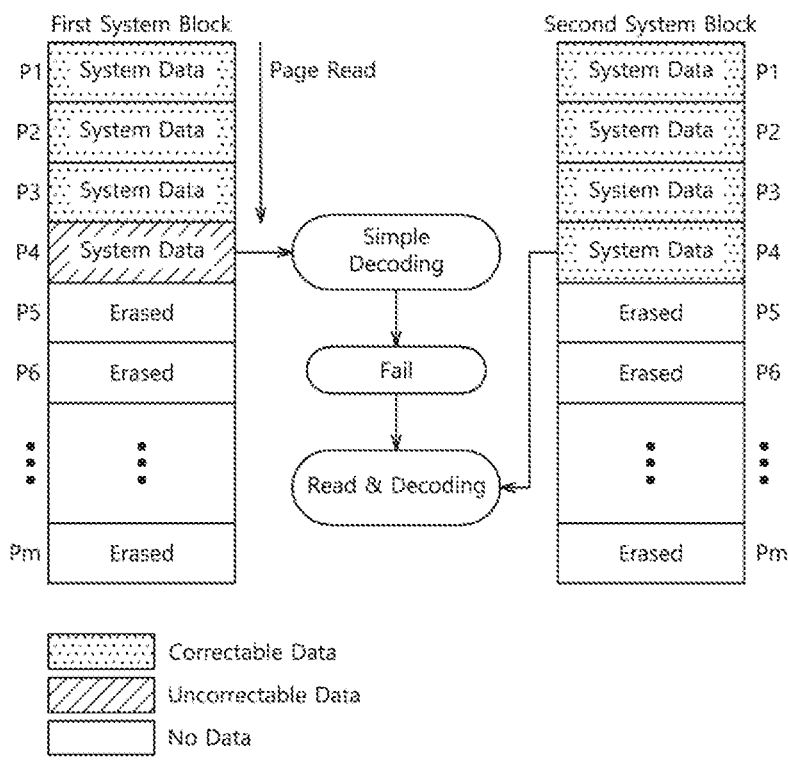
FIG. 6B is a diagram illustrating decoding for system data in accordance with an embodiment.

Referring to FIG. 6B, it is assumed that the first system data stored in the fourth page of the first system data block is uncorrectable data and the second system data stored in the fourth page of the second system data block is correctable data.

For example, the processor 220 provides a read command for reading out the first system data stored in the first page P1 of the first system data block, to the nonvolatile memory device 100. Then, the nonvolatile memory device 100 reads out the first system data from the first page P1 of the first system data block in response to the read command and provides the read-out first system data to the memory interface 250.

The memory interface 250 provides the first system data to the ECC circuit 240. The ECC circuit 240 performs simple decoding for the first system data. Since the first system data stored in the first page P1 to the third page P3 of the first system data block are correctable data, simple decoding for each first system data will succeed.

Thereafter, the processor 220 provides a read command for reading out the first system data stored in the fourth page P4 of the first system data block, to the nonvolatile memory device 100. Then, the nonvolatile memory device 100 reads out the first system data from the fourth page P4 of the first system data block in response to the read command and provides the read-out first system data to the memory interface 250.

The memory interface 250 provides the first system data to the ECC circuit 240. The ECC circuit 240 performs simple decoding for the first system data. Since the first system data stored in the fourth page P4 is uncorrectable data, the simple decoding will fail. The ECC circuit 240 provides information indicating that the result of decoding for the first system data stored in the fourth page P4 of the first system data block is a fail, to the processor 220.

The processor 220 provides a read command for reading out the second system data stored in the fourth page P4 of the second system data block, to the nonvolatile memory device 100. Then, the nonvolatile memory device 100 reads out the second system data from the fourth page P4 of the second system data block in response to the read command and provides the read-out second system data to the memory interface 250.

The memory interface 250 provides the second system data to the ECC circuit 240. The ECC circuit 240 performs simple decoding for the second system data. Since the second system data stored in the fourth page P4 of the second system data block is correctable data, the simple decoding for the second system data will succeed, and the second system data for which the simple decoding has succeeded may be loaded in the memory 230.

In this way, for system data as which the same data is stored in duplicate in two memory blocks, a recovery operation is not performed any more in the case where simple decoding fails, and recovery is performed by using the same system data stored in another memory block, thereby reducing unnecessary decoding.

At the step S415, the processor 220 may determine whether loading of system data is completed. If loading of system data is completed, the process may proceed to (A) and an operation shown in FIG. 5 may be performed. If loading of system data is not completed, the process may proceed to the step S405, and the second read operation for the system data stored in a next page may be performed.

FIG. 5 is a flow chart illustrating a method for operating a data storage device in accordance with an embodiment, for example, the data storage device 10 of FIG. 1. In particular, FIG. 5 illustrates a second recovery operation after the first recovery operation. The second recovery operation may include a recovery process for an open block in which user data is stored. In describing the method for operating the data storage device 10 shown in FIG. 5, reference is also made to FIGS. 1 to 3 and 6C.

Step S501 may be performed when loading of system data is completed at the step S415 of FIG. 4. At the step S501, the processor 220 may detect an open block in the user region of the nonvolatile memory device 100. Detecting an open block may be performed based on the system data loaded in the memory 230.

At step S503, the processor 220 may detect an erased page by scanning, without decoding, the open block. The erased page detected at the step S503 may be a first erased page among a plurality of erased pages existing in the open block. A process for detecting an erased page may be performed by various methods known in the art; thus, detailed description thereof is omitted here.

The processor 220 may perform one or more first read operations for detecting the first erased page in the open block. The processor 220 may control the operation of the ECC circuit 240 to skip decoding for the data read out by the first read operations. This was described above with reference to FIG. 6A. The processor 220 may determine a previous page (referred to as a 'first previous page') immediately adjacent to the detected first erased page, as a page at which programming is interrupted by the SPO.

At step S505, the processor 220 may control the nonvolatile memory device 100 to perform a third read operation for reading out the first user data stored in the first previous page adjacent to the detected first erased page. The processor 220 may control the operation of the ECC circuit 240 to perform decoding for the first user data read out by the third read operation (that is, program-interrupted user data). The decoding for the first user data, performed at the step S505, may be normal decoding.

At step S507, the processor 220 may determine whether decoding, that is, normal decoding, of the first user data read out from the first previous page failed. If it is determined that the decoding succeeded (S507, No), the process may proceed to step S515. If it is determined that the decoding failed (S507, Yes), the process may proceed to step S509.

At the step S509, the processor 220 may control the nonvolatile memory device 100 to perform again the third read operation for the first previous page, and may control the ECC circuit 240 to perform hard decision decoding for read-out first user data.

At step S511, the processor 220 may determine whether the hard decision decoding of the first user data read out from the first previous page failed. If it is determined that the hard decision decoding succeeded (S511, No), the process may proceed to the step S515. If it is determined that the hard decision decoding failed (S511, Yes), the process may proceed to step S513.

At the step S513, the processor 220 may interrupt the decoding for the first previous page and may process the first previous page as an invalid page.

At the step S515, the processor 220 may read the second user data stored in second previous pages before the first erased page except the first previous page. Then, the processor 220 may control the nonvolatile memory device 100 and the ECC circuit 240 to recover the second user data by performing full decoding for the read-out second user data.

Figure 6C:
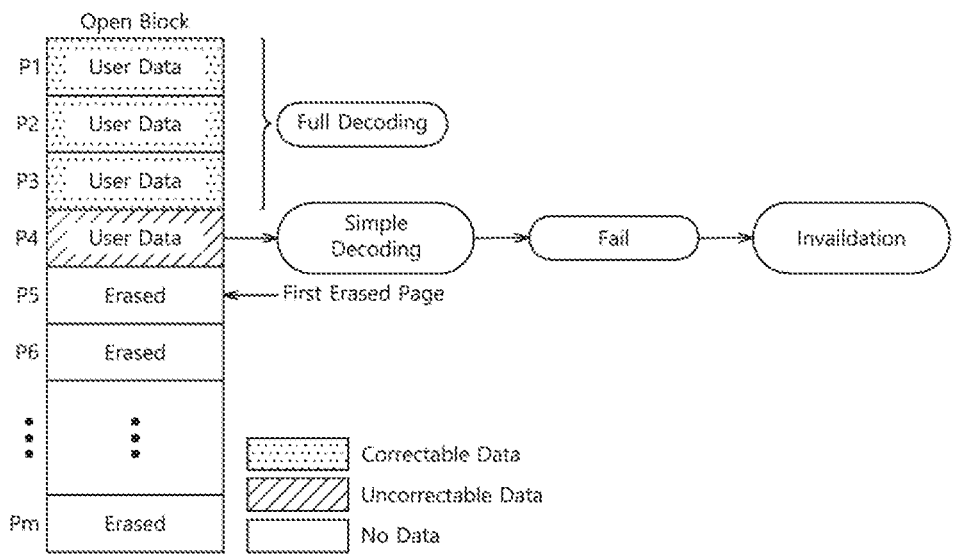
FIG. 6C is a diagram illustrating decoding for user data in accordance with an embodiment.

Further description below is made with reference to FIG. 6C. For convenience, it is assumed that a fourth page P4 of the open block is a first previous page and stores uncorrectable data.

For example, the processor 220 provides a read command for reading out the fourth user data stored in the fourth page P4 of the open block, to the nonvolatile memory device 100. Then, the nonvolatile memory device 100 reads out the fourth user data from the fourth page P4 of the open block in response to the read command and provides the read-out fourth user data to the memory interface 250.

The memory interface 250 provides the fourth user data to the ECC circuit 240. Then, the ECC circuit 240 performs simple decoding for the fourth user data. Since the fourth user data stored in the fourth page P4 of the open block is uncorrectable data, the simple decoding for the fourth user data fails. The ECC circuit 240 provides information indicating that the decoding for the fourth user data stored in the fourth page P4 of the open block failed, to the processor 220.

The processor 220 interrupts recovery for the data stored in the fourth page P4 of the open block, and processes the fourth page P4 of the open block as an invalid page.

Thereafter, the processor 220 sequentially provides read commands for reading out the first to third user data stored in first to third pages P1 to P3 of the open block, to the nonvolatile memory device 100. Then, the nonvolatile memory device 100 reads out the first to third user data from the first to third pages P1 to P3 of the open block in response to the read commands and provides the read-out first to third user data to the memory interface 250.

The memory interface 250 provides the first to third user data to the ECC circuit 240, and the ECC circuit 240 performs full decoding for the first to third user data.

Figure 7:
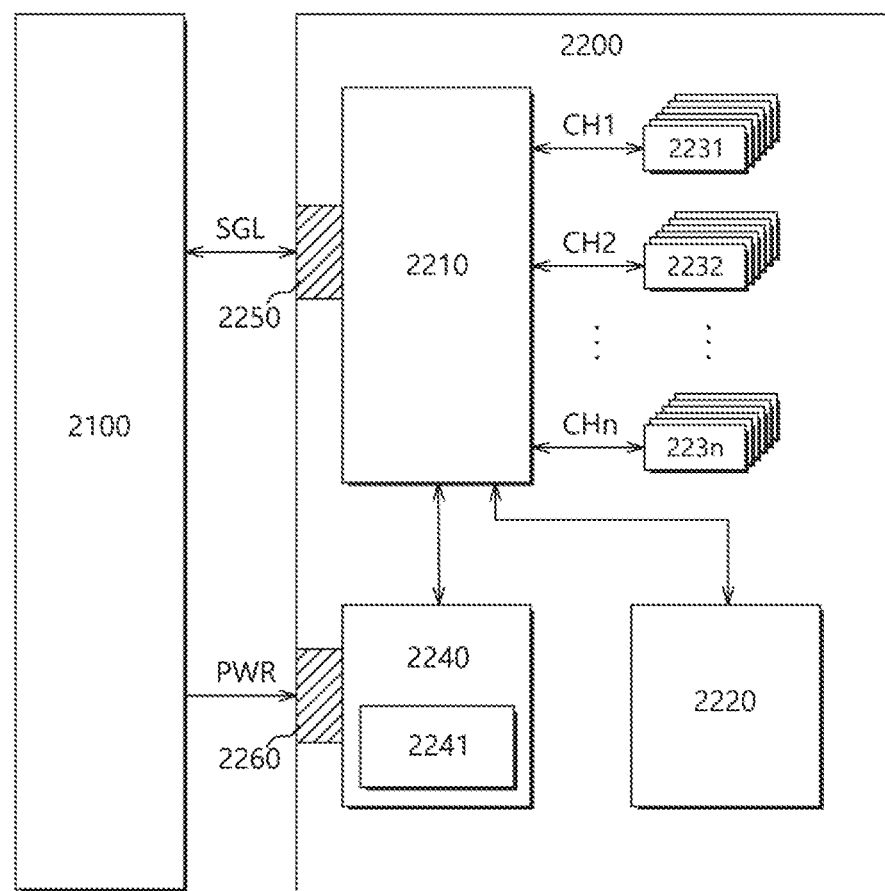
FIG. 7 is a diagram illustrating a data processing system including a solid state drive (SSD) in accordance with an embodiment of the present disclosure.

FIG. 7 is a diagram illustrating a data processing system 2000 including a solid state drive (SSD) in accordance with an embodiment. Referring to FIG. 7, the data processing system 2000 may include a host device 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host device 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the same channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host device 2100 through the signal connector 2250. The signal SGL may include a command, an address, data, and the like. The signal connector 2250 may be configured of various types of connectors according to an interfacing method between the host device 2100 and the SSD 2200.

Figure 8:
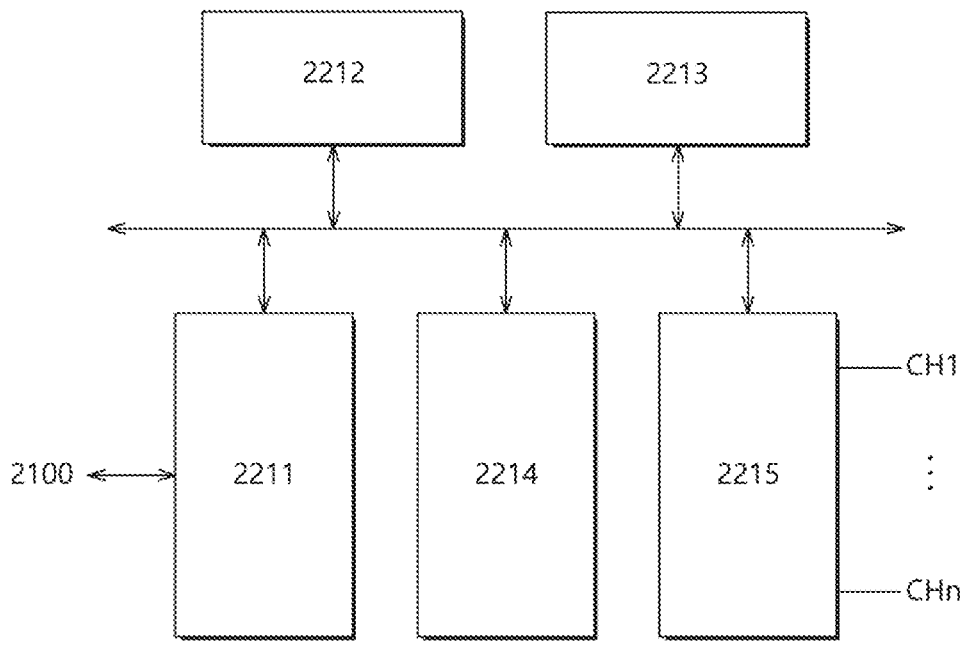
FIG. 8 is a diagram illustrating a controller in accordance with an embodiment of the present disclosure.

FIG. 8 is a diagram illustrating a controller in accordance with an embodiment of the present disclosure, for example, the controller 2210 of FIG. 7. Referring to FIG. 8, the controller 2210 may include a host interface 2211, a control component 2212, a random access memory (RAM) 2213, an error correction code (ECC) component 2214, and a memory interface 2215.

The host interface 2211 may perform interfacing between the host device 2100 and the SSD 2200 according to a protocol of the host device 2100. For example, the host interface 2211 may communicate with the host device 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-e or PCIe) protocol, and a universal flash storage (UFS) protocol. The host interface 2211 may perform a disc emulation function that the host device 2100 recognizes the SSD 2200 as a general-purpose data storage apparatus, for example, a hard disc drive HDD.

The control component 2212 may analyze and process the signal SGL input from the host device 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 9:
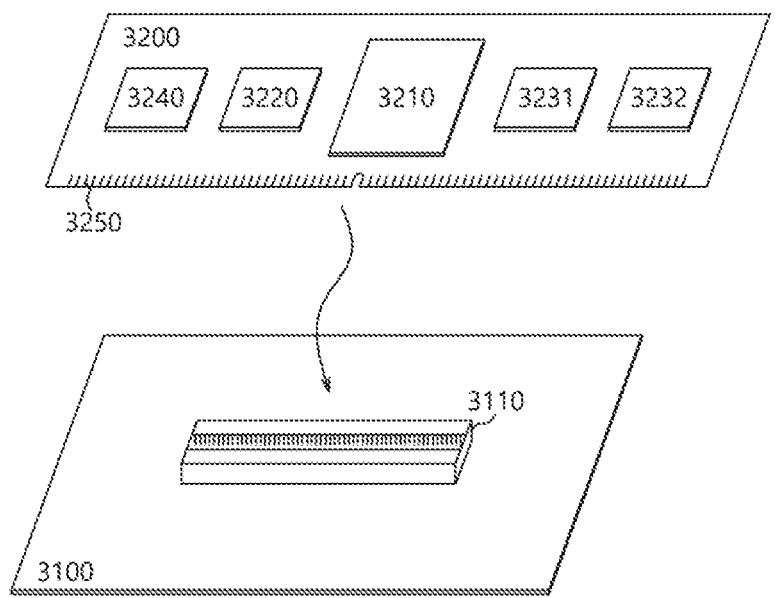
FIG. 9 is a diagram illustrating a data processing system including a data storage device in accordance with an embodiment of the present disclosure.

FIG. 9 is a diagram illustrating a data processing system 3000 including a data storage device in accordance with an embodiment. Referring to FIG. 9, the data processing system 3000 may include a host device 3100 and a data storage device 3200.

The host device 3100 may be configured in a board form such as a printed circuit board (PCB). Although not shown in FIG. 9, the host device 3100 may include internal functional blocks configured to perform various functions.

The host device 3100 may include a connection terminal 3110 such as a socket, a slot, or a connector. The data storage device 3200 may be mounted on the connection terminal 3110.

The data storage device 3200 may be configured in a board such as a PCB. The data storage device 3200 may refer to a memory module or a memory card. The data storage device 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage device 3200. The controller 3210 may be configured to have the same configuration as the controller 2210 illustrated in FIG. 8.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as a storage medium of the data storage device 3200.

The PMIC 3240 may provide power input through the connection terminal 3250 to the inside of the data storage device 3200. The PMIC 3240 may manage the power of the data storage device 3200 according to control of the controller 3210.

The connection terminal 3250 may be coupled to the connection terminal 3110 of the host device 3100. A signal such as a command, an address, and data and power may be transmitted between the host device 3100 and the data storage device 3200 through the connection terminal 3250. The connection terminal 3250 may be configured in various forms according to an interfacing method between the host device 3100 and the data storage device 3200. The connection terminal 3250 may be arranged in any one side of the data storage device 3200.

Figure 10:
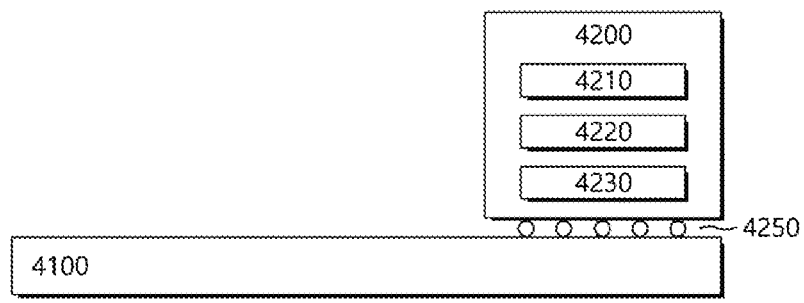
FIG. 10 is a diagram illustrating a data processing system including a data storage device in accordance with an embodiment of the present disclosure.

FIG. 10 is a diagram illustrating a data processing system 4000 including a data storage device in accordance with an embodiment. Referring to FIG. 10, the data processing system 4000 may include a host device 4100 and a data storage device 4200.

The host device 4100 may be configured as a board such as a printed circuit board (PCB). Although not shown in FIG. 10, the host device 4100 may include internal functional blocks configured to perform various functions.

The data storage device 4200 may be configured in a surface mounting packaging form. The data storage device 4200 may be mounted on the host device 4100 through a solder ball 4250. The data storage device 4200 may include a controller 4210, a buffer memory device 4220, and a nonvolatile memory device 4230.

The controller 4210 may control an overall operation of the data storage device 4200. The controller 4210 may be configured to have the same configuration as the controller 2210 illustrated in FIG. 8.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host device 4100 or the nonvolatile memory device 4230 through control of the controller 4210.

The nonvolatile memory device 4230 may be used as a storage medium of the data storage device 4200.

Figure 11:
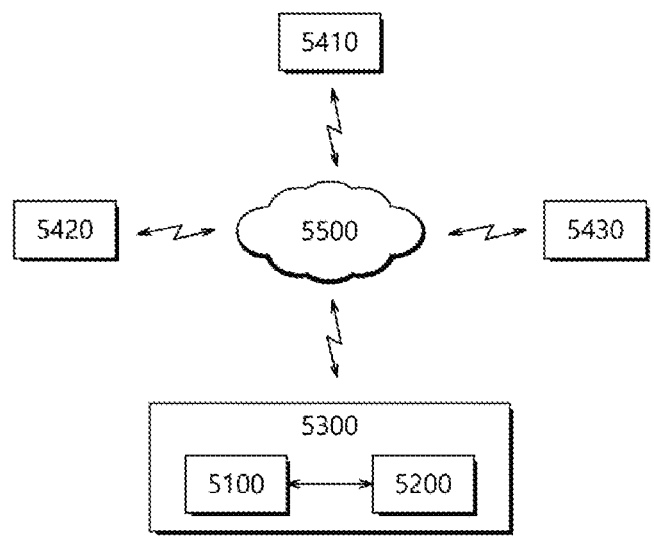
FIG. 11 is a diagram illustrating a network system including a data storage device in accordance with an embodiment of the present disclosure.

FIG. 11 is a diagram illustrating a network system 5000 including a data storage device in accordance with an embodiment. Referring to FIG. 11, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host device 5100 and a data storage device 5200. The data storage device 5200 may be configured of the data storage device 10 of FIG. 1, the data storage device 2200 of FIG. 7, the data storage device 3200 of FIG. 9, or the data storage device 4200 of FIG. 10.

Figure 12:
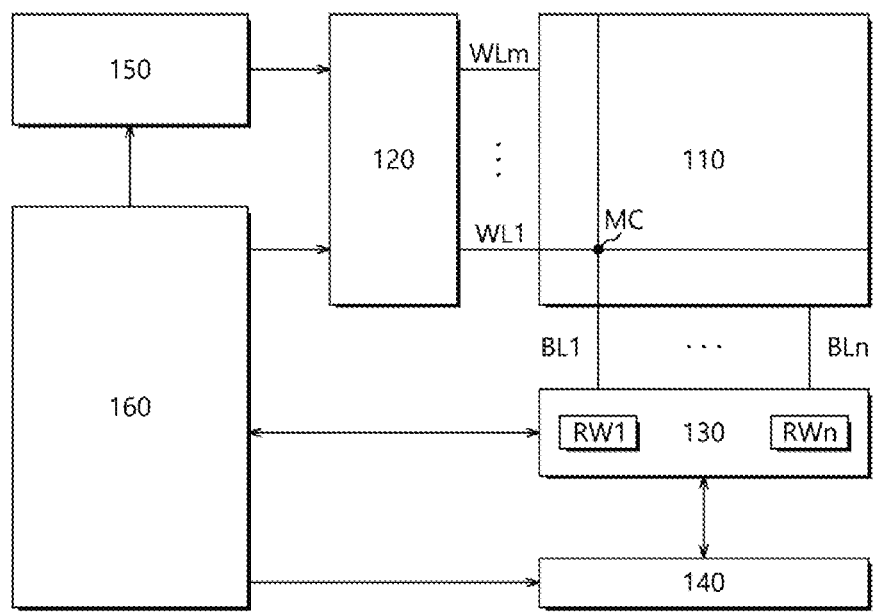
FIG. 12 is a block diagram illustrating a nonvolatile memory device included in a data storage device in accordance with an embodiment of the present disclosure.

FIG. 12 is a block diagram illustrating a nonvolatile memory device 100 included in a data storage device in accordance with an embodiment. Referring to FIG. 12, the nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown) (e.g., the controller 200 of FIG. 1). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, in a write operation, the data read/write block 130 may operate as the write driver configured to store data provided from an external apparatus in the memory cell array 110. In another example, in a read operation, the data read/write block 130 may operate as the sense amplifier configured to read data from the memory cell array 110.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

The above described embodiments of the present invention are intended to illustrate and not to limit the present invention. Various alternatives and equivalents are possible, as would be apparent to those skilled in the art in light of the present disclosure. The invention is not limited by the embodiments described herein. Nor is the invention limited to any specific type of semiconductor device. Thus, the present invention encompasses all additions, subtractions, and/or modifications that fall within the scope of the appended claims.

What is claimed is:

1. A data storage device comprising:
    a nonvolatile memory device including a first system data block and a second system data block as a duplicate of the first system data block; and
    a controller configured to control the nonvolatile memory device,
    wherein, when the data storage device is powered on after a sudden power off (SPO), the controller detects an erased page by scanning, without decoding, performs simple decoding for first system data of first system pages preceding the erased page, and, if the simple decoding fails, recovers the first system data by reading out second system data from second system pages, corresponding to the first system pages, of the second system data block.

2. The data storage device according to claim 1, wherein the controller detects the erased page by controlling the nonvolatile memory device to perform read operations for one or more pages of the first system data block, skipping decoding for data that is read out from the first system data block by the read operations, and thereby determining the erased page.

3. The data storage device according to claim 1, wherein the simple decoding includes normal decoding and hard decision decoding.

4. The data storage device according to claim 3, wherein the controller controls the nonvolatile memory device to perform read operations for the respective first system pages to read out the first system data therefrom, performs the normal decoding for the read-out first system data, controls, if the normal decoding failed, the nonvolatile memory device to perform again the read operations for the first system pages, and performs the hard decision decoding for the first system data read from the first system pages by performing again the read operations.

5. The data storage device according to claim 1, wherein, when loading of the first system data is completed, the controller detects an open block in the nonvolatile memory device based on the first system data, detects an erased page by scanning, without decoding, the open block, performs simple decoding for first user data stored in a previous first user page immediately adjacent to the erased page, and, if the simple decoding for the first user data failed, interrupts decoding and processes the first user page as an invalid page.

6. The data storage device according to claim 5, wherein the controller performs full decoding for second user data stored in second user pages preceding the erased page excluding the first user page.

7. The data storage device according to claim 6, wherein the full decoding includes normal decoding, hard decision decoding and soft decision decoding.

8. The data storage device according to claim 7, wherein the controller controls the nonvolatile memory device to perform read operations for the respective second user pages to read out second user data therefrom, performs the normal decoding for the read-out second user data, controls, if the normal decoding failed, the nonvolatile memory device to perform again the read operations for the second user pages, performs the hard decision decoding for the second user data read out by performing again the read operations, controls, if the hard decision decoding failed, the nonvolatile memory device to perform again the read operations for the second user pages, and performs the soft decision decoding for second user data read out from the second user pages by performing again the read operations.

9. A method for operating a data storage device, comprising:
   detecting, when the data storage device is powered on after a sudden power off (SPO), an erased page by scanning, without decoding, a first system data block of a nonvolatile memory device;
   performing simple decoding for first system data stored in first system pages preceding the erased page;
   determining whether the simple decoding failed; and
   recovering, if it is determined that the simple decoding failed, the first system data for which the simple decoding failed, by reading out second system data from corresponding second system pages of a second system data block, which is a duplicate block of the first system data block.

10. The method according to claim 9, wherein the detecting of the erased page comprises:
   performing a read operation for one or more first system pages of the first system data block; and
   skipping decoding for one more first system data read out from the one or more first system pages by the read operation, and thereby determining the erased page.

11. The method according to claim 9, wherein the performing of the simple decoding comprises:
   performing read operations for the respective first system pages preceding the erased page;
   performing normal decoding for the first system data read out from the first system pages;
   determining whether the normal decoding failed;
   performing again, if it is determined that the normal decoding fails, the read operations for the first system pages; and
   performing hard decision decoding for first system data read out from the first system pages by performing again the read operations.

12. The method according to claim 9, further comprising:
   determining whether loading of the first system data is completed.

13. The method according to claim 12, further comprising:
   detecting an open block in the nonvolatile memory device based on the first system data;
   detecting an erased page by scanning, without decoding, the open block;
   performing simple decoding for first user data stored in a previous first user page immediately adjacent to the erased page;
   determining whether the simple decoding for the first user data failed; and
   interrupting decoding and processing the first user page as an invalid page, if it is determined that the simple decoding for the first user data failed.

14. The method according to claim 13, further comprising:
   after the processing of the first user page as an invalid page, performing full decoding for second user data stored in second user pages preceding the erased page excluding the first user page.

15. The method according to claim 14, wherein the performing of the full decoding comprises:
   performing read operations for the respective second user pages;
   performing normal decoding for the second user data read out from the second user pages;
   determining whether the normal decoding failed;
   performing again, if it is determined that the normal decoding fails, the read operations for the second user pages;
   performing hard decision decoding for the second user data read out from the second user pages by performing again the read operations;
   determining whether the hard decision decoding failed;
   performing again, if it is determined that the hard decision decoding failed, the read operations for the second user pages; and
   performing soft decision decoding for the second user data read out from the second user pages by performing again the read operations.

16. A data storage device comprising:
   a memory device including a first system data block and a second system data block; and
   a controller configured to:
   control the memory device to store original system data in the first system data block and duplicate system data in the second system data block;
   detect an erased page by scanning the first system data block without decoding;
   read, and perform simple decoding of, first system data, which is stored in at least one first data page preceding the erased page in the first system data block;
   if the simple decoding for the first system data fails, read second system data from a second data page of the second system data block, the second system data being duplication data of the first system data; and
   recover the first system data using the second system data.

* * * * *